July 6, 1937.    H. R. BRAND ET AL    2,085,949
MULTIPLE CONTROL SYSTEM
Filed Feb. 28, 1933    6 Sheets-Sheet 1

INVENTORS
HARRY R. BRAND
CHARLES A. FAUSEL
BY
ATTORNEY

July 6, 1937.   H. R. BRAND ET AL   2,085,949
MULTIPLE CONTROL SYSTEM
Filed Feb. 28, 1933    6 Sheets-Sheet 5

INVENTORS
HARRY R. BRAND
CHARLES A. FAUSEL
BY
ATTORNEY

INVENTORS
HARRY R. BRAND
CHARLES A. FAUSEL
BY
ATTORNEY

Patented July 6, 1937

2,085,949

UNITED STATES PATENT OFFICE 2,085,949

MULTIPLE CONTROL SYSTEM

Harry Russell Brand, New York, N. Y., and Charles A. Fausel, Glen Ridge, N. J.; said Fausel assignor to said Brand Application February 28, 1933, Serial No. 658,950

7 Claims. (Cl. 194—4)

The present invention relates to the control of automatic machinery for preparing or producing commodities and has for an object to provide a system in which the initiation of a performance or the continuation of operation of a machine may be controlled by remotely situated manually operated means.

Our invention is particularly adapted for use with automatic machines for preparing and delivering portions of food on order, such for example as shown in Patent No. 1,848,104, issued March 8, 1932. The machine described in said patent is adapted to be controlled from a single ordering station, such as the cashier's desk of a restaurant. The present invention has for an object to provide for the control of a machine from a plurality of independent stations. Thus, as applied to a restaurant, our invention contemplates the provision of manually operable order transmitting means at a plurality of convenient locations in the restaurant and preferably at each customer's place, whereby a waiter or preferably the customer himself may transmit an order to the machine.

Another object is to provide means for preventing the transmission of another order from the same station until the transmitting device has been reset by means not readily accessible to the customer.

Another object is to provide means which will identify the station from which the order was sent. Thus in a preferred embodiment of our invention an identifying means, such as a token, is issued in response to each order transmitted, the token bearing indicia identifying the point of origin of the order, so that when the commodity has been prepared the token will indicate where the commodity is to be delivered.

Another object is to provide means whereby the identifying means thus issued will directly control the operation of the commodity preparing machine.

Another object is to provide means which will indicate substantially the sequence in which the orders are transmitted. Further objects of the invention will appear in the following description, which with the accompanying drawings, illustrates one embodiment of the invention, and thereafter the novelty and scope of the invention will be pointed out in the claims.

The specific embodiment of our invention chosen for illustration, comprises a plurality of key operated mechanisms, hereinafter referred to as "ordering keys", and a "selector" controlled by the ordering keys, preferably through electromechanical means. The selector in turn controls the operation of a commodity preparing and delivering machine, hereinafter referred to as the "producer". The producer may comprise any suitable machine which will prepare commodities in response to electric order impulses, and hence it is not illustrated in full in the drawings but is indicated in the diagram Fig. 15 by certain impulse receiving parts and also certain delivery release parts.

When an ordering key is operated an impulse is transmitted to the selector which is preferably located near the producer. The impulse causes a token identifying said ordering key to be issued into a hopper within the selector. From the hopper the token is automatically picked up and passed through the selector to a container and in its passage through the selector it closes a control circuit of the producer, thereby entering an order in said producer. A number of tokens may be issued simultaneously because their release is controlled at the will of the operators at a plurality of stations, and their issue at best will be irregular, but they will be picked out of the hopper at fixed minimum intervals and substantially in the sequence in which the ordering keys are depressed, and they will be piled up in the container in the order in which they pass through the selector. Since the orders transmitted to the producer by the passage of the tokens from the hopper to the container may take place at a higher rate than the producer may operate to fill them, the producer is preferably provided with an accumulator which will store the orders and deliver them to the machine at fixed minimum intervals. The producer is also preferably of the type in which the commodities, as they are produced, are passed into a closed chamber from which they can be taken out only by the operation of token-controlled mechanism. Suitable signalling means indicate when there is an order in the chamber ready for delivery. An operator may then withdraw the lowermost token from the container and use it to obtain the commodity from said chamber and the indicia on the token will indicate to what station the order is to be delivered.

Figure 15:
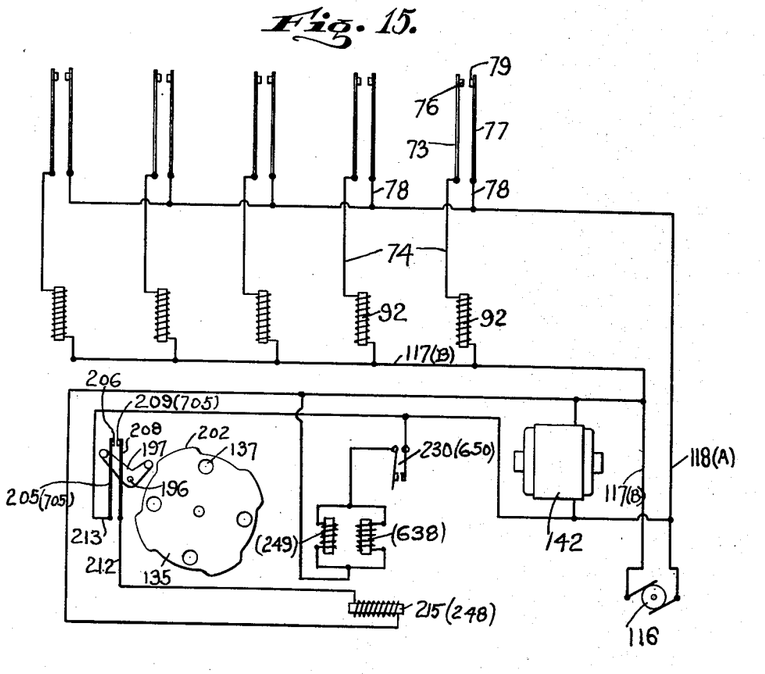
Fig. 15 is a diagrammatic view of electric circuits and related devices.

A typical producer with which our control system has been used is fully illustrated and described in our copending application Serial No. 644,736, filed November 28, 1932, now Patent Number 2,033,178 and for convenience of reference certain parts shown in Fig. 15 which correspond to parts of said producer are marked with reference numerals and characters partly in parentheses, the parenthetical portions being the numbers or characters used to represent such parts in said copending application.

Having given above a brief outline of our invention as illustrated in the embodiment chosen for illustration, we may now proceed to a more detailed description.

Ordering key

Figures 1, 3, 4, 5:
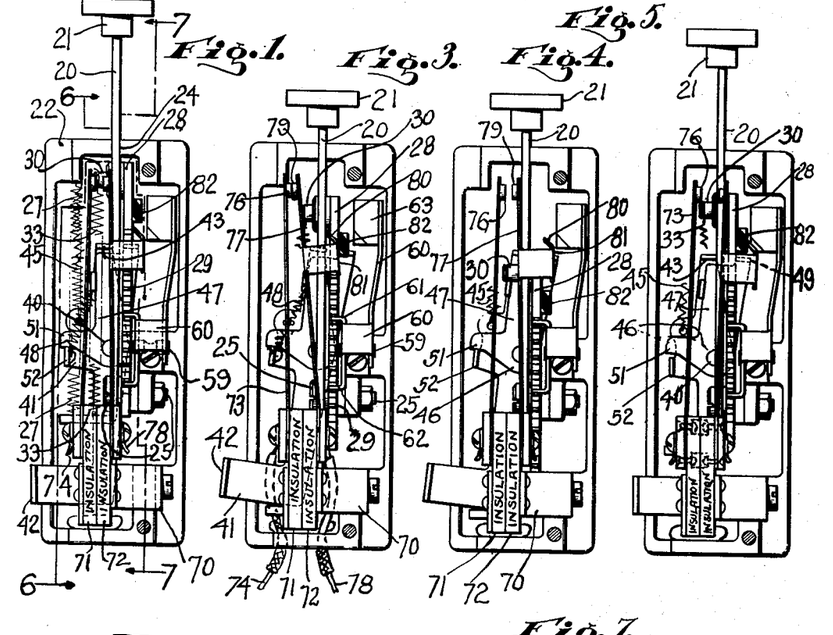
Figure 1 is a view in elevation, with cover removed, of an ordering station key mechanism.
Fig. 3 is a view, in elevation, of the mechanism shown in Fig. 1, with certain parts removed, and showing the key fully depressed.
Fig. 4 is a view, in elevation, of the mechanism shown in Fig. 1, with certain parts removed and showing the completed key operation.
Fig. 5 is a view, in elevation, of the mechanism shown in Fig. 1 with certain parts removed, and certain parts in the act of being restored to their normal position.
Figures 2, 6, 7:
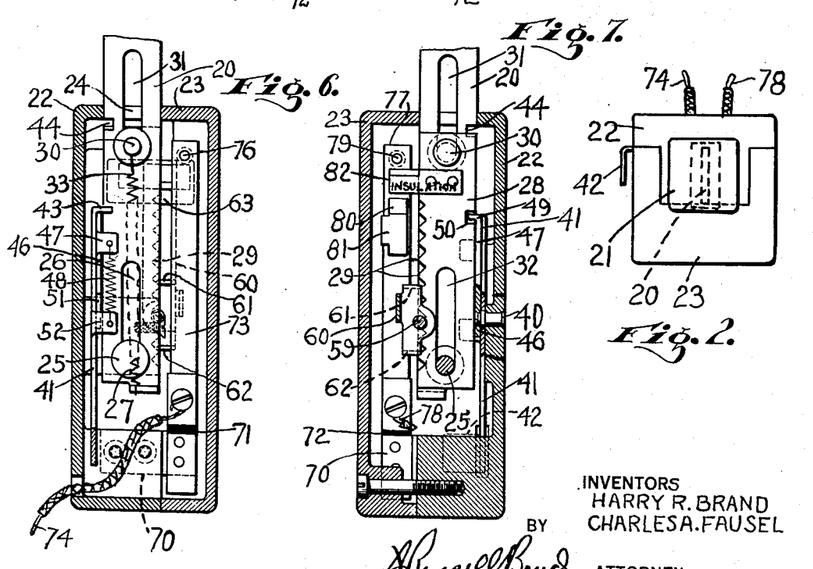
Fig. 2 is a plan view of the key shown in Fig. 1.
Fig. 6 is a view in vertical section taken on the line 6—6 of Fig. 1 with certain parts removed.
Fig. 7 is a view in vertical section taken substantially on the line 7—7 of Fig. 1 and with certain parts removed.

Referring to Figs. 1 and 2 the ordering key comprises a stem 20 having a key 21 fixed thereto. The stem projects from and is slidably mounted in a casing 22, having a cover 23. The casing is adapted for support on a counter or like restaurant fixture with the key visible and accessible to the customer and the waiter. A slot 24, see also Fig. 6, formed in the casing 22, and a headed stud 25 fixed to the latter and freely embraced by a slot 26 in the stem 20, serve to guide said stem. A spring 27, under tension, one end of which is anchored to the casing 22 and the opposed end suitably fixed to the stem 20, serves to return the key to normal position after it is actuated in a manner and for a purpose hereinafter described. The stud 25 cooperates with the opposed ends of the slot 26 to desirably limit the movements of the stem 20.

A bar 28, see particularly Fig. 7, having a series of teeth 29 formed on one edge thereof, is suitably mounted adjacent to the stem 20 for reciprocating movements in cooperation with the latter. A shouldered stud 30 fixed to the bar 28 is adapted to move freely in and be guided by a slot 31 in the stem 20. A slot 32 in the bar 28 embraces the stud 25 and together with the stud 30 and the slot 31 serves to guide the bar 28. A spring 33, under tension, anchored at one end to the stud 30 has its opposed end attached to the stem 20, and is adapted to cause a relative movement between the bar 28 and the stem 20, and also to hold the said bar and stem in fixed relation, when desired.

Rotatably mounted on a stud 40 journalled in the casing 22, see particularly Fig. 7, is a lever 41 having an elbow 42 protruding through an opening in the casing 22, said lever has at its opposite end a tooth 43 adapted for cooperation with a notch 44 in the stem 20. A spring 45, see Fig. 1, under tension, is both suitably attached to the lever 41 and anchored to the casing 22 and is adapted to restore the lever 41 when it is manually operated as is hereinafter described. Fixed on the stud 40 (see Fig. 7) and adjacent to the lever 41 is a bell-crank 46 of which one arm 47 has, suitably fastened thereto, one end of a spring 48 under tension, the opposed end being anchored to the lever 41. The arm 47 has a tooth 49 formed thereon adapted to engage a notch 50 in the bar 28, when desired. An arm 51 of the bell-crank 46 is cooperatively adjacent to a lug 52 of the lever 41, both serving to maintain desired relations between the bell-crank 46 and the lever 41.

Rotatably mounted at 59 on the casing 22, is a lever 60 having formed thereon a tooth 61 and a tooth 62, and having a weighted portion 63. The teeth 61 and 62 are operatively adjacent to the teeth 29 of the bar 28 and are so relatively placed with respect to each other and to the pivoted center 59 as to act in the manner of an escapement release for the bar 28, as hereinafter described.

Fixed to the casing 22, Figs. 3 and 4, is a bracket 70 carrying blocks 71 and 72 of electric insulation. Fast to block 71 is a spring blade 73 in electrical contact, on its fixed end, with one leg 74 of a transmission circuit and bearing at is free end a contact point 76. Fast to the block 72, and electrically insulated from the blade 73, is a spring blade 77 to the fixed end of which is electrically connected the other leg 78 of said transmission circuit. On the free end of the blade 77 is a contact point 79 operatively opposed to the point 76, but normally separated therefrom. Formed as a part of the blade 77 is a lug with faces 80 and 81, the former angled as a cam surface and the whole suitably placed for coaction with a prong 82, preferably of non-conducting material, fixed to the bar 28.

Operation of the ordering key

To transmit an order impulse to the selector the key 21 is depressed until stopped by the abutment of the stud 25 and the opposed end of the slot 26. As the stem 20 nears the end of its stroke, the tooth 43 of the lever 41, under impulse of the spring 45, engages the notch 44, thus latching the stem 20 and preventing its immediate return under impulse of the spring 27. Thus the full depression of the key 21, and the consequent movement of the lever 41, permits the partial rotation of the bell-crank 46, under impulse of the spring 48, and the tooth 49 is withdrawn free of the notch 50, thereby releasing the bar 28 which, under impulse of its spring 33, is carried to the limit of its stroke in the direction taken by the depressed stem 20. During this movement of the bar 28 the prong 82 operatively rides along the cam surface 80 and face 81, forcing the spring blade 77 towards the spring blade 73 and causing contact between the points 79 and 76. The relative position of the spring blades 77 and 73 and their flexure under pressure results in a desirable wiping contact and a closing of the transmission circuit for a purpose hereinafter described. The length of the face 81 in part determines the duration of this contact. To further control this period and maintain a closed circuit for a desired interval, the movement of the released bar 28 is sufficiently slowed down by a virtual braking action resulting from the escapement coaction between the teeth 29 and the teeth 61 and 62 of the weighted lever 60. The full travel of the bar 28 will carry the prong 82 clear of the face 81, thus permitting the return of the spring blades 73 and 77 to their normal, inactive position and thereby breaking the transmission circuit which remains open until the next depression of the key.

The desired functions having been performed, the key 21 may be returned to its initial position in the following manner. Suitable pressure on the elbow 42 will partially rotate the lever 41, and thus disengage the tooth 43 from the notch 44, effecting the release of the stem 20, which under impulse of the spring 27 returns the key 21 to its initial and operative position. The return movement of the stem 20 carries the bar 28 to its initial position, the coaction of stud 30, the opposed face of slot 31 and the spring 33 in part effecting this return. The tooth 49 engages the notch 50 of the bar 28 and the latter is thus under operative restraint. During the return of the bar 28, the prong 82 inoperatively passes to the rear of the faces 80 and 81 of the blade 77, and rests in actuating position at the completion of the key restoring performance. The escapement movement hereinbefore described also acts as a brake to govern the speed of the return of the key. The ordering key is preferably mounted at the rear edge of a counter or table with only the key proper projecting above the surface of the counter so that the part 42 of the reset lever lies below the level of the counter where it is not readily accessible to the customer.

*The selector*

Figure 8:
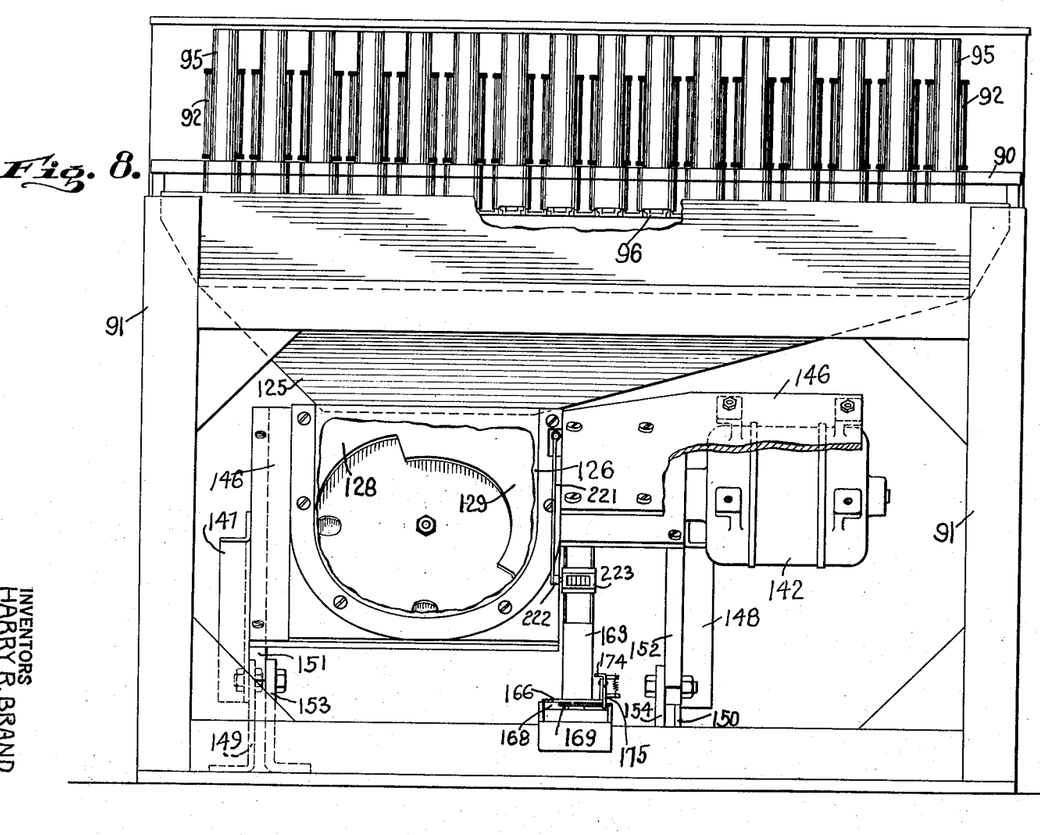
Fig. 8 is a view in front elevation of a controlling mechanism hereinafter termed a "selector"
Figures 9, 10:
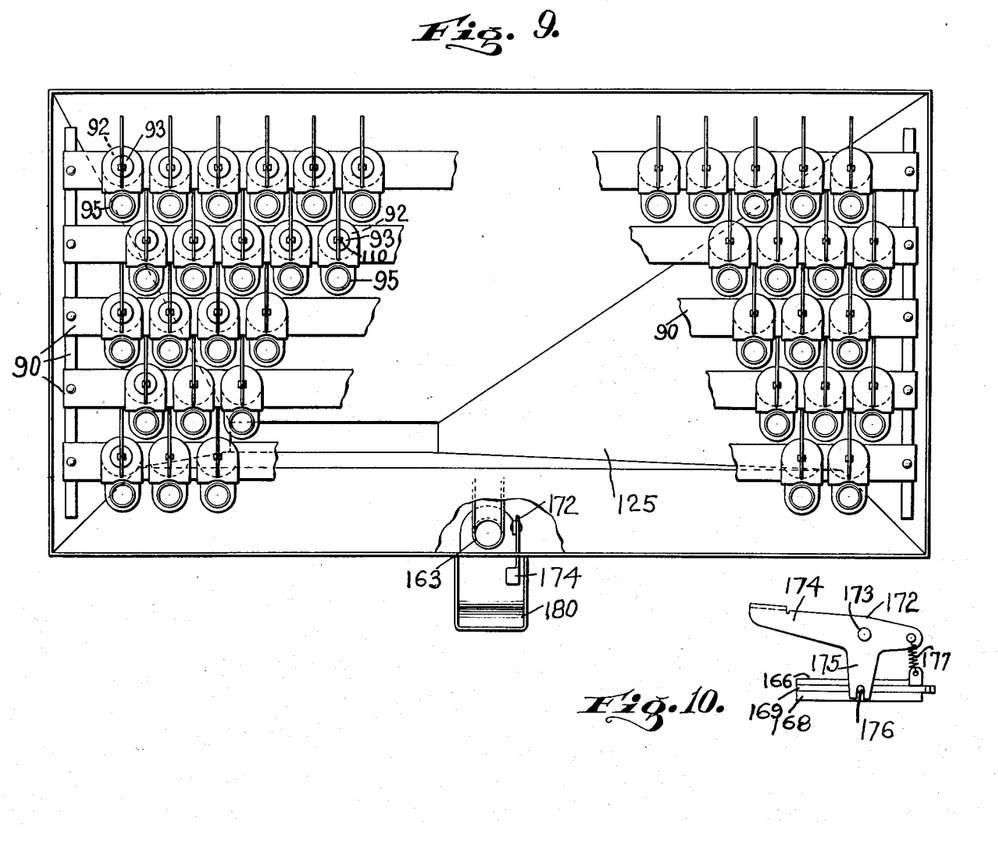
Fig. 9 is a plan view of the selector with certain parts removed.
Fig. 10 is an enlarged detail view in side elevation of a part of the selector.
Figure 11:
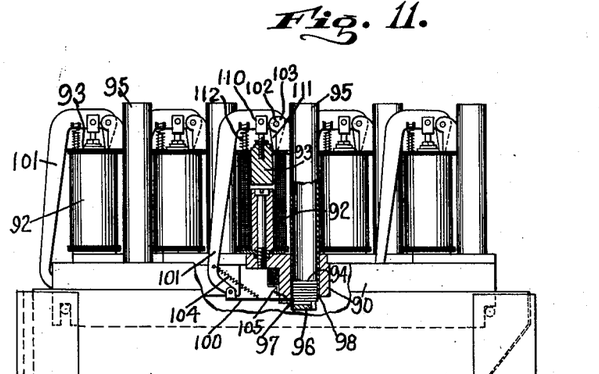
Fig. 11 is an end elevation of the selector, as viewed from the left hand side of Fig. 8, and partly in section.

Referring now particularly to Figs. 8, 9 and 11, the selector has a grid 90 supported on a suitable frame 91. This grid provides a mounting for a set of solenoids or electromagnets 92 which correspond in number to the ordering keys described above. In other words there is a solenoid in the transmission circuit of each key, which solenoid is energized by depression of said key. Each solenoid or electromagnet has a plunger 93 which is magnetically actuated to eject a token 94, as will be explained hereinafter.

Figure 12:
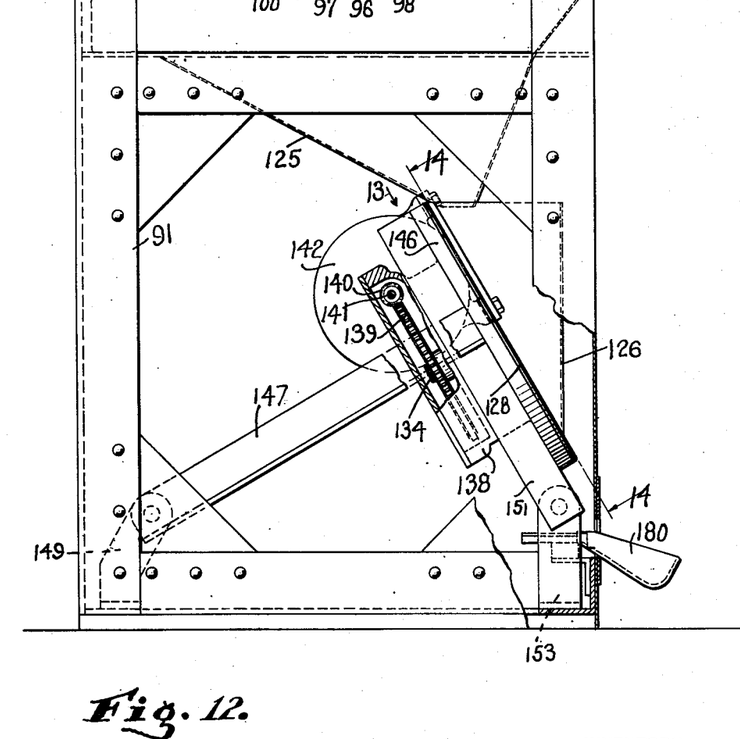
Fig. 12 is a plan view of a token used in and by the selector.

One of the tokens is illustrated in Fig. 12 and it will be observed that it is marked with a numeral identifying a particular ordering key. There is a distinctive token marking for each key and a suitable quantity of tokens bearing each marking.

Operatively adjacent to each solenoid 92, and detachably fixed relative thereto and on the base 90, is a container 95, preferably tubular, supported substantially in a vertical position and adapted to freely store a suitable number of the tokens 94 bearing the distinctive marking of the key controlling said solenoid. The upper end of said container is open to facilitate charging it with tokens, and the lower end is partially closed by a recessed piece 96. In the side of the container 95 adjacent to the solenoid 90 and just above the piece 96, there is a slot 97 to receive an ejector blade 100, and in the opposed side of the container there is a slot 98. The lower edge of this slot is flush with the top face of the end piece 96, and the slot forms an opening slightly wider than the thickness of a token 94 but less than double the thickness thereof. The length of the slot 98 is such as to permit free passage of a token therethrough, when desired.

The ejector blade 100 (see particularly Fig. 11) is hinged to the free end of an arm 101 pivoted at 102 on a bracket 103, fixed relative to the solenoid 92. A spring 104, under tension, serves to flexibly maintain the blade 100 against a guiding surface 105 of the base 90, cooperatively placed relative to the slot 97.

The plunger 93 is adjustably fastened to a slotted head 110 pivoted on the arm 101. A tail 111 of said arm bears against the plunger 93 to limit the swing of the arm in a clockwise direction (as viewed in Fig. 11) under the urge of a spring 112. Thus the blade is normally held just clear of the lowermost token in the container 95.

Referring to Fig. 15, 116 is a source of electric current with conductors 117 and 118 leading from opposite poles thereof. The leads 78 from the ordering keys are connected to the conductor 118 while the leads 74 are connected through the respective solenoids to the conductor 117. Thus whenever the points 76 and 79 of an ordering key are contacted, the solenoid 92 associated with that particular ordering key will be energized, giving an impulse to its plunger 93. Such movement of the plunger swings the arm 101 on its pivot, causing the blade 100 to eject the lowermost token 94 in the container through the slot 98 and clear of the supporting piece 96. A token next above the ejected one rests on the uppermost portions of the piece 96, the blade 100 being depressed in the recess of the said piece, and upon the full return of the blade, this token has its edge opposed to the edge of said blade.

The lower ends of the containers (Figs. 8 and 11) are exposed to a chute 125 suitably enclosed and leading to a hopper 126. The latter is substantially semi-circular in the plane 14—14, and is tapered at its lower edge (see also Figs. 13 and 14) being partially enclosed on its inner side by a plate 128. This plate 128 has a large substantially circular opening therein with a portion of the periphery of the circle stepped radially inward to form a shield 129. The purpose of this shield will be explained hereinafter.

Adapted for clock-wise rotation (as viewed in Fig. 14) and fast to a shaft 134 is a disk 135 which lies back of the plate 128 and substantially closes the opening therein. Openings 137 are formed through the disk 135 at suitable angular intervals and in such location that they will pass back of the shield 129 as the disk is rotated. The openings 137 are each of a size to pass a token 94 freely therethrough. The disk 135 is preferably of substantially the same thickness as the tokens and it is inclined from the vertical plane, as shown in Fig. 11, so that tokens dropping into the hopper will slide along the face of said disk.

The shaft 134 (see particularly Fig. 11) which carries said disk is suitably journaled in a frame 138. Fixed upon said shaft is a worm gear 139 adapted to be driven by a worm 140 on a shaft 141 also journaled in the frame 138. The shaft 141 is driven by a motor 142. A plate 146 to which are fixed the frame 138 and the motor 142, is supported by members 147 and 148 fast thereto and carried on brackets 149 and 150 mounted on the main frame 91 and by members 151 and 152 also fast to the plate 146 and carried on brackets 153 and 154 rigidly attached to the said main frame. The disk 135 is adapted to freely revolve between the plate 128 and the plate 146. An aperture 160 (see Figs. 13 and 14) in the plate 146, suitably larger than a token 94, is so placed as to be passed by the openings 137 during rotation of the disk 135. Fast to the rear face of the plate 146 is a chute 161 with an open side 162 in register with the aperture 160, and angularly disposed to a vertical container 163 fixed on the frame 91. Both said chute and container are adapted to carry freely the tokens 94, and are relatively so placed as to transmit and receive, respectively, the said tokens, as is hereinafter described.

Fixed to the frame 91 and to the lower end of container 163 is a base (see Figs. 8, 10 and 13), composed of a pair of vertically spaced plates 166 and 168. The upper plate 166 of the pair is formed with an opening therethrough substantially of a size equal to the bore of said container and in alignment therewith. Between the plates 166 and 168 is an ejector plate 169 pivotally mounted at 170 and provided with an opening 171 adapted to receive a token. A bell crank 172 pivoted at 173, has a horizontally projecting arm 174 and a slotted vertical arm 175 which embraces a pin 176 projecting from the ejector 169. A spring 177, under tension, is suitably mounted to give partial rotation to the bell crank 172 and to the ejector 169. A slot 178 (Fig. 13) in the ejector 169 coacting with a pin 179 fixed in the plate 168 serves to limit the motion of the said ejector and the connected bell-crank under impulse of the spring 177. The arm 174 is adapted for manual operation of the bell crank 172 against the tension of the spring 177.

A cup 180 (Fig. 11) is desirably placed adjacent to the ejector 169 for a purpose hereinafter described. Means are further provided to operate the producer by a released token and to that end there is provided a detector device comprising in part (see Figs. 13, 14 and 16) a stud 181 fixed in a bracket 182 mounted on the plate 146. Pivoted on the stud 181 is a lever 183, one end of which has fastened thereto a spring 184 under tension. The opposite end of the lever is adapted to serve as a detent.

Coacting with the lever 183 and adjacent thereto is a bell-crank 185 also pivoted on the stud 181. This bell crank lever has an arm 186 which is resiliently connected to the lever 183 by the spring 184. An arm 187 of the bell crank 185 carries a pin 188 fast thereto. This pin coacts with the lever 183 to maintain a desired relation between the lever 183 and the bell crank 185, the spring 184 cooperating.

The free end 190 of the arm 187 passes through a slot 191 in the plate 146 and is suitably placed for registering with the openings 137. A pin 192, fast to the plate 146, carries one end of a spring 193, under tension, the opposed end being fast to the arm 186. The spring 193 acts to keep the end 190 of the arm 186 in pressure contact with the rotating disk 135, tending to pass through the openings 137 when presented thereto.

Figure 13:
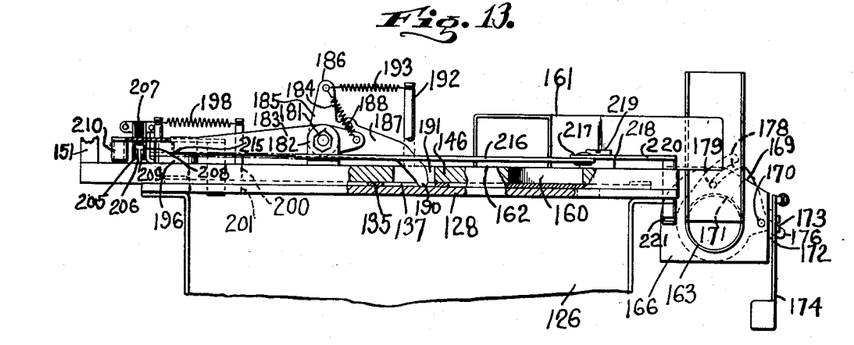
Fig. 13 is an enlarged fragmental view looking in the direction of the arrow 13 of Fig. 11 and showing a token disk and certain coacting mechanism.
Figure 14:
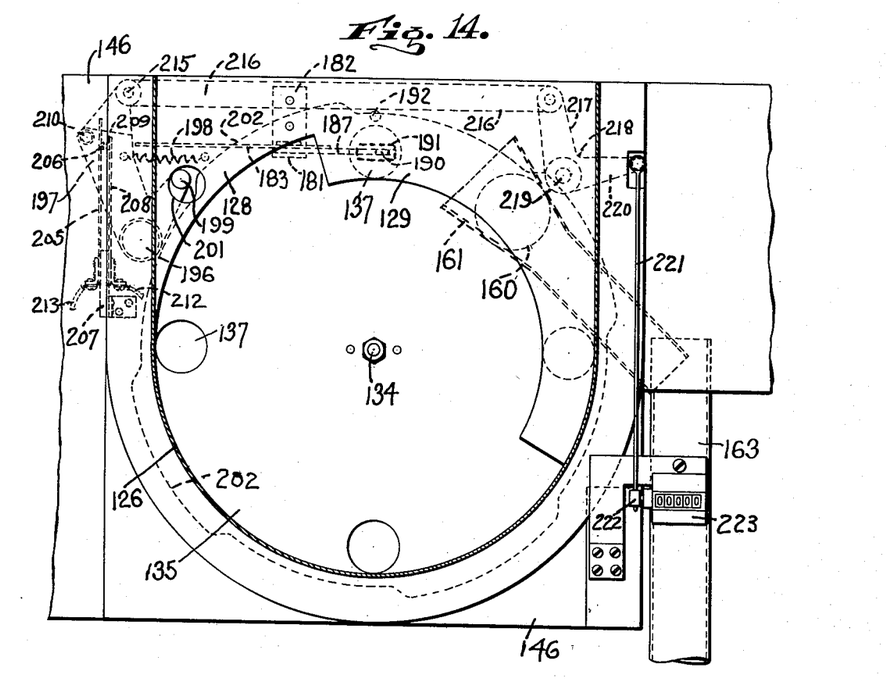
Fig. 14 is an enlarged fragmental view in section taken on the line 14—14 of Fig. 11.

Pivoted on the plate 146 at 196 (see Figs. 13 and 14) is a lever 197. A spring 198 under tension, is attached at one end to the lever and at the other to the plate 146. A roller 199 suitably mounted on the lever 197 projects freely through alined openings 200 and 201 formed respectively in the plates 146 and 128. Operatively placed for coaction with the roller 199, are cams 202 formed on the periphery of the disk 135 and disposed in predetermined relation to the openings 137. These cams serve to force the roller 199 outward while an opening 137 is approaching registry with the slot 191 but they release the roller when registry is established to permit partial rotation of the lever 197, under the urge of the spring 198. But normally the lever 197 cannot respond appreciably to the pull of said spring because the adjacent end of the lever 183 stands in its way, as shown in Fig. 13.

A spring blade 205 having a contact point 206 on its free end is fixed to a block 207 of insulating material fixedly mounted on the plate 146. On the block 207 is also fastened a spring blade 208, the free end of which carries a contact point 209 electrically insulated from the blade 205. A roller 210 suitably mounted on the lever 196 is adapted to coact with the blade 205 in a manner to cause pressure between the contact points 206 and 209 when the lever 196 is partially rotated, as will be described hereinafter.

The lead wires 212 and 213 respectively connect with the conductors 117 and 118, see also Fig. 15, and the solenoid 215 (248) is so connected in the line as to be energized when the contact points 206 and 209 close the circuit by pressure of one upon the other.

Referring again to Figs. 13 and 14, at 215 of the lever 197, is pivoted one end of a link 216 the opposed end of which has pivoted connection to an arm 217 of a bell-crank 218 rotatably mounted at 219 on the plate 146. The arm 220 of the bell-crank 218 has suitably connected thereto a depending rod 221 attached to the feeding lever 222 (see also Fig. 8) of a counter 223 carried on a bracket 224 fixed to the frame 91.

The selector device may be suitably enclosed to prevent unwarranted access to the tokens and mechanism contained therein.

*Operation of the selector*

As previously described the depression of a key stem 20 to its extreme limit closes a circuit through a certain one of the solenoids 92 which results in a downward movement of the plunger 93. A partial rotation is given the arm 101 and the consequent thrust of the blade 100 ejects a single opposed token 94. This token drops into the chute 125 and thence is guided into the hopper 126, the token, finally bearing against the face of the disk 135, owing to a desirable inclination of the latter.

Figure 16:
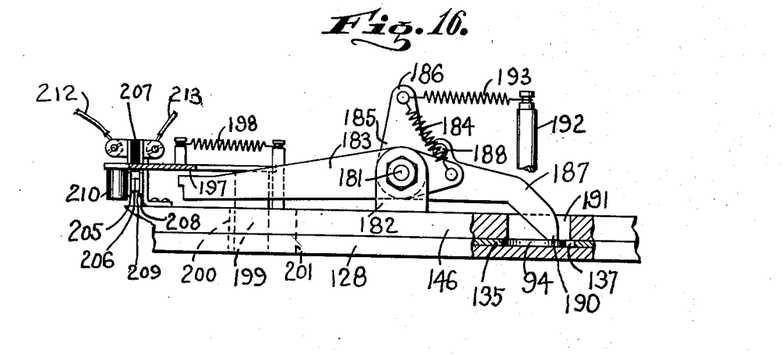
Fig. 16 is an enlarged detail view of a portion of Fig. 13 but showing certain parts in another position.

The motor 142 constantly rotates the disk 135 during the period of service of the equipment, and in due course the token drops into an opening 137. Thus the token is picked and carried up by the disk. As the token is carried along by the disk it passes back of the shield 129 and then engages the end 190 of the arm 186. The arm 186 is thus swung outward and through its spring connection with the lever 183 swings the latter clear of the lever 197, as shown in Fig. 16. Since at the same time the roller 199 has cleared one of the cams 202 the lever 197 is now swung on its pivot by its spring 198 and the roller 210 causes the point 206 to electrically contact with the point 209, thereby closing the circuit which energizes the order magnet or solenoid 215 (248) of the producer. A further rotation of the disk 135 carries the token to the aperture 160 in the plate 146 and the token is discharged, by gravity into the chute 161 and finally comes to rest in the container 163. Pressure on the arm 174 of the bell-crank 172 causes the ejector 169 to deposit the token in the cup 180 where it is accessible to the operator.

Through the coaction of the connected mechanism, link 216, bell-crank 218 and the rod 221, the movement of the lever 197 will cause the counter 223 to register an order.

The manually ejected token may be used to release the prepared commodity from the delivery chamber of the producer by inserting said token in the token-controlled mechanism 230 (650) graphically illustrated in Fig. 15 and also described in the copending application hereinbefore referred to.

While we have described a preferred embodiment of our invention it will be understood that this is to be taken as illustrative and not limitative and that we reserve the right to make such changes in form, construction, and arrangement of parts as fall within the spirit and scope of the following claims.

We claim:

1. The method of controlling from a plurality of order stations a machine adapted to produce commodities in response to order impulses and to deliver the commodities into a closed chamber adapted to be opened by a token, said method comprising the steps of transmitting order impulses at will from said order stations to a central station, issuing tokens at said central station identifying the stations from which the orders are sent, segregating the tokens and arranging them substantially in the sequence in which the orders are received and by such segregation and arrangement relaying the order impulses to the machine, and thereafter using the tokens successively to release the commodities from the token controlled chamber.

2. In a multiple control system for a machine adapted to prepare commodities in response to order impulses and to deliver the same into a token-controlled chamber, a central station, a plurality of independently operable transmitters, each adapted to transmit an order impulse to the station, means at the station for relaying to the machine control impulses corresponding to said order impulses, a token identifying each transmitter at said station, and means actuable by each order impulse for issuing one of said tokens identifying the origin of the order impulse, each token being adapted for use in said token controlled chamber to release a commodity therefrom.

3. In a multiple control system for a machine adapted to prepare commodities in response to order impulses and to deliver the same into a token controlled chamber, a receiving station, a relay at said station, a plurality of independently operable transmitters, each adapted to transmit an order impulse to the machine through said relay, a token identifying each transmitter at said station, means actuable by each order impulse received at the relay for issuing the token identifying the transmitter sending the impulse, each token being adapted for use in said token controlled chamber to release a commodity therefrom.

4. A multiple control system for a machine adapted to produce commodities in response to order impulses and having token controlled means for releasing commodities produced, said system comprising a plurality of order stations, a receiving station, a plurality of tokens at the receiving station for identifying the order stations respectively and for operating said token controlled means, means controlled by each ordering station for issuing a token at the receiving station identifying said ordering station, a relay controlled by the tokens issued to transmit order impulses to said machine, means for bringing the issued tokens individually into actuating engagement with the relay at time intervals not shorter than a predetermined minimum, and an open receptacle for the issued tokens from which the tokens may be removed to operate said token controlled means.

5. In combination a machine adapted to prepare commodities in response to order impulses, a plurality of order stations, a relay station, means operable at will at each order station for transmitting control impulses to the relay station, means at the latter station for relaying order impulses sequentially to the machine at time intervals not shorter than a predetermined minimum and in response to the control impulses from the order stations, and means at a central point controlled by said control impulses for identifying the stations from which the control impulses were transmitted and substantially the sequence of transmittal of said control impulses, so as to indicate to which stations the commodities are to be delivered and the sequence of such deliveries.

6. In combination a machine adapted to prepare commodities in response to order impulses, a plurality of order stations, a central station, means at each order station operable at will to transmit a control impulse to the central station, means at the central station operable in response to each impulse received to discharge a token identifying the order station from which the impulse was transmitted, means at the central station for relaying order impulses sequentially to the machine at time intervals not shorter than a predetermined minimum and in response to the impulses from the order stations, and means for keeping the tokens discharged substantially in the order in which the control impulses are received at the central station, so that the discharged tokens will not only designate the stations to which the commodities produced by the machine are to be delivered but will also indicate by the order of the tokens the order of such deliveries.

7. In combination a machine adapted to prepare commodities in response to order impulses, a plurality of order stations, a central station, means at each order station operable at will to transmit a control impulse to the central station, means at the central station for issuing a token in response to each impulse received, each token identifying the order station from which the impulse was transmitted, means for segregating the tokens issued and discharging them at time intervals not shorter than a predetermined minimum, means comprising a relay operated by each token as it is being discharged to transmit an order impulse to said machine, and means for keeping the discharged tokens substantially in the order in which the control impulses are received at the central station, so that the discharged tokens will not only designate the stations to which the commodities produced by the machine are to be delivered but will also indicate by the order of the tokens the order of such deliveries.

HARRY RUSSELL BRAND.
CHARLES A. FAUSEL.